2 Sheets—Sheet 1.
H. WEST.
Wagon-Brake.
Patented Sept. 29, 1836.
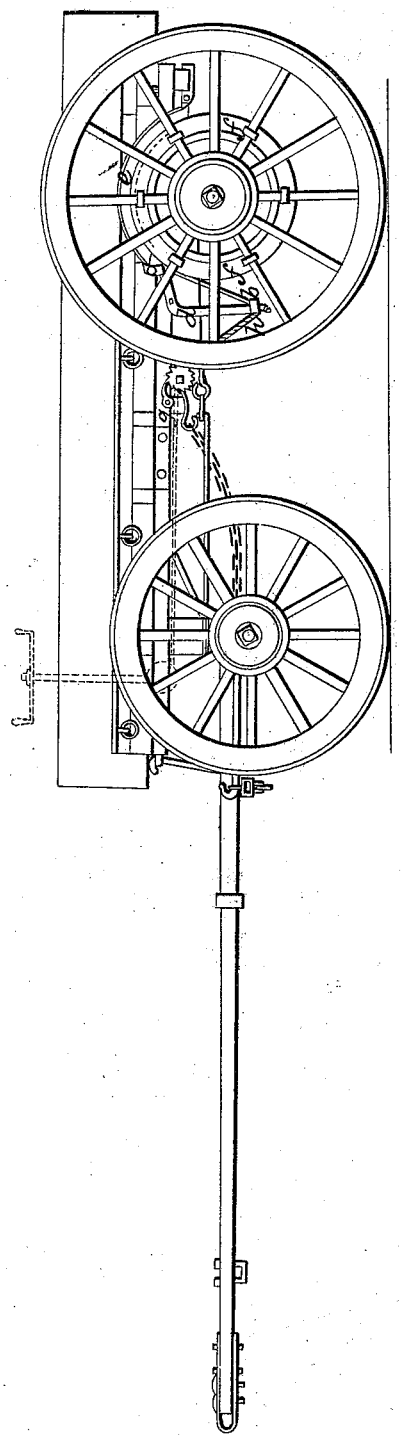
Side Elevation of Waggon.

2 Sheets—Sheet 2.
H. WEST.
Wagon-Brake.
Patented Sept. 29, 1836.
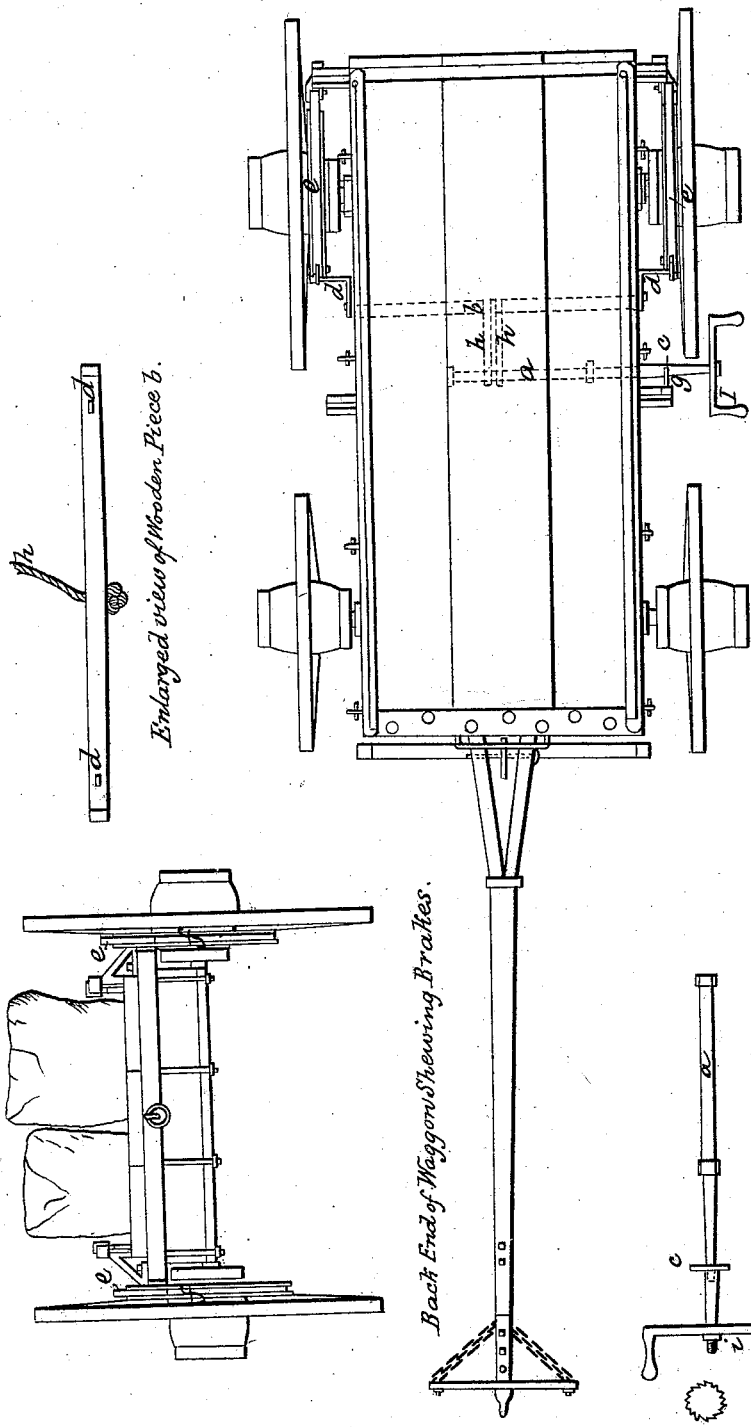

UNITED STATES PATENT OFFICE.

HENRY WEST, OF QUINCY, MASSACHUSETTS.

BRAKE FOR WAGONS, CARRIAGES, &c.

Specification of Letters Patent No. 36, dated September 29, 1836.

*To all whom it may concern:*

Be it known that I, HENRY WEST, of Quincy, in the county of Norfolk and Commonwealth of Massachusetts, mason, have invented and applied to use a new and useful improvement in the use and application of brakes to the wheels of wagons, stagecoaches, and other vehicles for carrying burdens on the common roads to check their speed in descending hills, which invention and improvement I specify as follows—that is to say, for the better understanding thereof drawings on three plates are hereto annexed and are to be taken and considered as a part of this specification.

Plate number one is a side elevation of a wagon, with a view of the brake; plate numbered two is an end elevation of the same with part of the brake drawn separately, and at large; plate numbered three is a top view of the same; the figures excepting parts of the brake at large are drawn on a scale of three-fourths of an inch to the foot, and the parts aforesaid are drawn on a scale of an inch to a foot.

$f$, indicates what I denominate the brake wheel, which is a circular rim like that of a wheel made of wood, and hooped with iron with a flange on each side rising about an inch and a half above the rim so as to form a groove for the brake. This brake wheel should be in the proportion of about two feet diameter and about three inches in thickness, and two inches in breadth for a wagon wheel of five feet in diameter. The brake wheel is fastened to the spokes of the hindmost wheel of the wagon, stage coach or other carriage, on the inside of the wheel, by clasps of iron passing around the spokes and through the rim of the brake wheel, and confined by nuts on the opposite sides. $e$, indicates the brake of wood about two inches wide and about three inches thick capped on the outside with a strong piece of iron like the tire of a wheel fastened to it by screws, and nails to give strength to the brake, which on the inside is concave so as to fit in the groove and to conform as nearly as may be to the periphery of the brake wheel. The brake turned at the hindmost end turns upon a hinge fixed to a piece of wood, attached to the wagon, carriage, or vehicle, and acts as a lever where the hinge serves as the fulcrum. At the opposite end the brake is connected with a lever indicated $d$, made of wrought iron of the shape represented in the drawing in plate numbered one, and fixed to a cross piece, which passes under the carriage, and is fixed to a like lever of a like brake to a like brake wheel, on the other side when two brakes are used, which is deemed best in all cases. At the end of this lever is a rope or chain $h$, connected with the shaft $a$, of the ratchet wheel $c$. The ratchet wheel may be turned by a crank $d$ having a square socket adjusted to the projecting end of the shaft of the ratchet wheel, and operating like a watch key. When it is required to have the crank near the driver's seat, as in stage coaches, and the like carriages, the rope $h$, may be extended and fixed to the shaft of the wheel $j$, which may be operated upon by a bevel wheel, to be moved by the crank. There ought to be a brake wheel and brake for each hind wheel of the carriage.

What I claim as new is—

The use and application of a brake in connection with the brake wheel in manner aforesaid for the purposes aforesaid.

In testimony that the above is a true specification of my said invention as above described I have hereunto set my hand this ninth day of April, in the year of our Lord eighteen hundred and thirty-six.

HENRY WEST.

Witnesses:
AUGUSTUS H. FISKE,
FRANS. I. HUMPHREY.